(12) United States Patent
Kondo et al.

(10) Patent No.: US 8,130,303 B2
(45) Date of Patent: Mar. 6, 2012

(54) SOLID-STATE IMAGING APPARATUS

(75) Inventors: Toru Kondo, Hino (JP); Seisuke Matsuda, Hachioji (JP)

(73) Assignee: Olympus Corporation, Tokyo (JP)

( * ) Notice: Subject to any disclaimer, the term of this patent is extended or adjusted under 35 U.S.C. 154(b) by 446 days.

(21) Appl. No.: 12/372,796

(22) Filed: Feb. 18, 2009

(65) Prior Publication Data

US 2009/0207290 A1    Aug. 20, 2009

(30) Foreign Application Priority Data

Feb. 20, 2008    (JP) ................................. 2008-038149

(51) Int. Cl.
 *H04N 5/335* (2011.01)
(52) U.S. Cl. ........................................ 348/308; 348/301
(58) Field of Classification Search .......... 348/300–302, 348/308–310; 250/208.1
See application file for complete search history.

(56) References Cited

U.S. PATENT DOCUMENTS

2003/0117510 A1*  6/2003  Sakurai et al. ................ 348/308
2008/0112016 A1*  5/2008  Kume ........................... 358/408

FOREIGN PATENT DOCUMENTS

JP          2007-20156 A       1/2007

\* cited by examiner

*Primary Examiner* — Huy K Mai
(74) *Attorney, Agent, or Firm* — Westerman, Hattori, Daniels & Adrian, LLP

(57) ABSTRACT

A solid-state imaging apparatus including: a pixel section having a plurality of pixels, each pixel containing an amplification section for outputting onto an output signal line, and a reset section for resetting an accumulation section; a noise suppressing section with using a first signal being an output from the pixel at the time of resetting for suppressing noise components contained in a second signal corresponding to the signal electric charges; and a control section for, of the outputs onto the output signal line of a first pixel being subject of the noise suppressing operation, respectively limiting the first signal and the second signal to a first electric potential and to a second electric potential with using an output resulting from reset operation onto the output signal line from a second pixel different from the first pixel and connected to the same one output signal line as the first pixel.

10 Claims, 15 Drawing Sheets

HIGH-LUMINANCE LIGHT

BLACK SUN PHENOMENON DUE TO RESET POTENTIAL CHANGE

TRANSVERSE STRIPE(HIGHLIGHT TRANSVERSE STRIPE)PHENOMENON DUE TO SIGNAL POTENTIAL CHANGE

HIGHLIGHT TRANSVERSE STRIPE PHENOMENON + BLACK SUN PHENOMENON

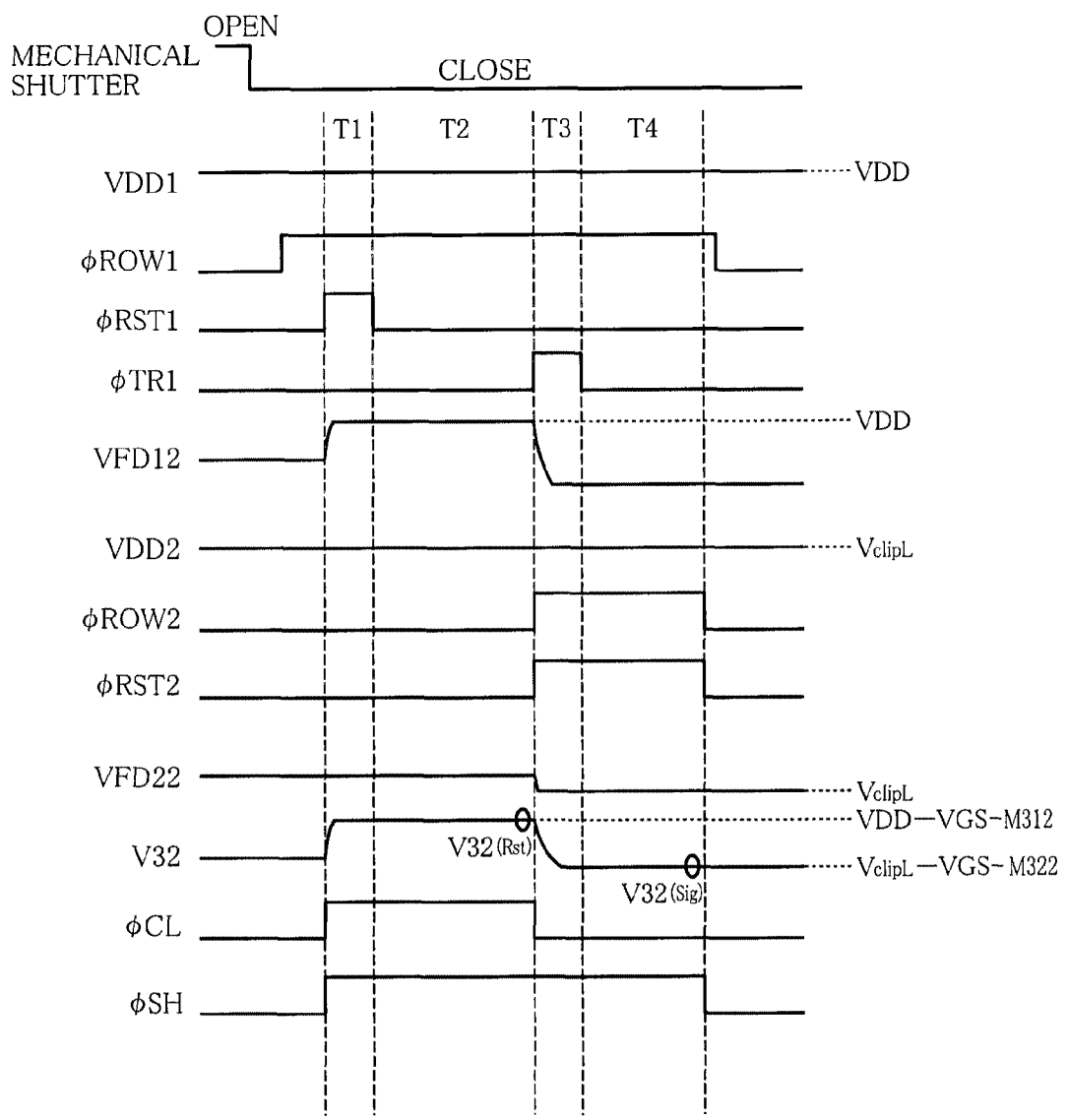

US 8,130,303 B2

SOLID-STATE IMAGING APPARATUS

This application claims benefit of Japanese Patent Application No. 2008-38149 filed in Japan on Feb. 20, 2008 the contents of which are incorporated by this reference.

BACKGROUND OF THE INVENTION

The present invention relates to solid-state imaging apparatus for use for example in a video camera, digital still camera, etc., and more particularly relates to the solid-state imaging apparatus using an amplified solid-state imaging device having an amplification function within its imaging region.

In recent years, MOS image sensors having active element within pixel capable of forming peripheral circuits into an on-chip system are used as imaging device in the imaging apparatus for example of digital still camera. FIG. 1 shows a circuit construction of an ordinary MOS image sensor. While a plurality of pixels are two-dimensionally arranged in CMOS image sensors, only 3 pixels P11, P12, P13 arranged into 1 row by 3 columns are shown here for ease of explanation. Each pixel P11, P12, P13 respectively includes: a photodiode PD; a floating diffusion section FD11, FD12, FD13 having electrostatic capacitance; a transfer transistor M1; a reset transistor M2; an amplification transistor M311, M312, M313; and a select transistor M4. The pixels P11, P12, P13 are connected to a correlated double sampling circuit (CDS circuit) 10 respectively through a vertical signal line 31, 32, 33. The vertical signal lines 31, 32, 33 are connected respectively to one end of biasing transistors M51, M52, M53 serving as constant current supply having the other end grounded, where each biasing transistor M51, M52, M53 is controlled by a bias current regulating voltage Vbias.

The CDS circuit 10 includes: a clamp transistor M11; a sample-and-hold transistor M12; a clamp capacitor C11; and a sample-and-hold capacitor C12. The CDS circuit 10 is connected to a horizontal signal line 7 through a select transistor M6 so as to output image signal through an output amplifier 5. A transfer pulse φTR1, reset pulse φRST1, row select pulse φROW1 associated with control of the transfer transistor M1, reset transistor M2 and select transistor M4 within pixel, and a column select pulse φH1, φH2, φH3 associated with control of the column select transistor M6 are outputted respectively from a vertical scanning section 2 and a horizontal scanning section 4 under control of a timing control section 6. Further, a clamp pulse φCL and a sample-and-hold pulse φSH associated with control of the clamp transistor M11 and the sample-and-hold transistor M12 are outputted from the timing control section 6.

In thus constructed MOS image sensor, image quality degradation is caused by a variance in the threshold of the amplification transistor M311 to M313 and a reset noise of the reset transistor M2 of each pixel. At the CDS circuit 10, however, these noises are removed by taking a difference between a pixel output after reset and a pixel output after transfer of signal electric charges of the photodiode PD so that only the signal of light serving as image signal can be outputted.

With the MOS image sensor having CDS circuit, it is known that, when a high-luminance light is incident, a completely blackened image as if without any incidence of light is generated. This phenomenon will be referred to hereinafter as "black sun phenomenon". The black sun phenomenon in MOS image sensor will now be described. FIG. 2 is a timing chart for explaining operation where the black sun phenomenon occurs when a high-luminance object is photographed. A description will be given below on an assumption that a high-luminance light is incident on the pixel P12 at a center shown in FIG. 1 and that light is scarcely incident on the pixels P11, P13 of the rest.

(1): At first in a reset period T1, the reset pulse φRST1 is driven to H level in the condition where the row select pulse φROW1 is at H level so as to fix the floating diffusion section FD11, FD12, FD13 of each pixel to a power supply voltage VDD. The clamp pulse φCL and the sample-and-hold pulse φSH of the CDS circuit 10 are also driven to H level.

(2): In a subsequent reset-sample period T2, the reset pulse φRST1 is brought to L level. At this time, while voltages VFD11, VFD13 (VFD13: not shown) of the floating diffusion section FD11, FD13 at the pixel P11, P13 where the high-luminance light is not incident do not change, the voltage VFD12 of the floating diffusion section FD12 at the pixel P12 where the high-luminance light is incident falls as shown for example due to a leaking-in of electric charges from the photodiode PD. An electric potential V32(Rst) of the vertical signal line 32 to which the pixel P12 is connected is thereby also lowered to attain (VFD12−VGS-M312). It should be noted that VGS-M312 in this case is a gate-source voltage of the amplification transistor M312 of the pixel P12. In an end period of the reset-sample period T2, then, the clamp pulse φCL of the CDS circuit 10 is brought to L level to clamp electric potential of each vertical signal line 31 to 33.

(3): In a subsequent signal transfer period T3, the transfer pulse φTR1 is driven to H level to transfer the signal electric charges of photodiode PD of each pixel P11 to P13 respectively to the floating diffusion section FD11 to FD13. At this time, since the voltage VFD12 of the floating diffusion section FD12 at the high-luminance light incident pixel P12 has already been lowered in the reset-sample period T2, it falls by only a small amount from the voltage in the reset-sample period T2 (or does not change when the voltage VFD12 of the floating diffusion section FD12 has been lowered to a lowest level possible due to the leaking-in of electric charges) even when the electric charges of the photodiode PD is transferred. Therefore, the electric potential V32(Sig) of the vertical signal 32 also changes only by a small amount. It should be noted that a change scarcely occurs at this time also in the electric potentials of the other vertical signal lines 31, 33, since it is supposed that light is scarcely incident on the pixels P11, P13.

(4): In a subsequent signal sampling period T4, a difference potential [V32(Rst)−V32(Sig)] is retained at the sample-and-hold capacitor C12 by a processing operation of the CDS circuit 10. Next, the difference potential processed at the CDS circuit 10 is outputted as image signal through the column select transistor M6 and the output amplifier M5. At this time, in the pixel P12 where the high-luminance light is incident, the difference potential [V32(Rst)−V32(Sig)] by the CDS processing is small due to change in the electric potential V32(Rst) of the vertical signal line 32 in the reset-sample period T2, whereby a darkened output is outputted as image signal and the black sun phenomenon occurs.

The problem of occurrence of the black sun phenomenon can be eliminated with respect to still picture taking by providing a mechanical shutter. At the time of taking image without using a mechanical shutter for example in taking a moving picture, however, its occurrence cannot be avoided.

Further, when a high-luminance light is incident, its effect may in some cases occur also in a pixel region outside the pixel into which an intense light has entered. FIG. 3 is a timing chart for explaining an operation in the occurrence of a highlight transverse stripe phenomenon that occurs on the periphery of a pixel on which the high-luminance light is incident. In this case, too, a description will be given below on an assumption that a high-luminance light is incident on the pixel P12 at a center shown in FIG. 1 and that light is scarcely incident on the pixels P11, P13 of the rest. It is also supposed in this case that the black sun phenomenon does not occur.

(1): At first in a reset period T1, the reset pulse φRST1 is similarly driven to H level in the condition where the row select pulse φROW1 is at H level so as to fix the voltages VFD11 to VFD13 of the floating diffusion section FD11, FD12, FD13 of each pixel to a power supply voltage VDD. The clamp pulse φCL and the sample-and-hold pulse φSH of the CDS circuit 10 are also driven to H level.

(2): In a subsequent reset-sample period T2, the clamp pulse φCL of the CDS circuit 10 is brought to L level toward an end of the period to clamp the voltage of the floating diffusion section FD11 to FD13 of each pixel to the CDS circuit 10 through the vertical signal line 31 to 33.

(3): In a subsequent signal transfer period T3, the transfer pulse φTR1 is driven to H level to transfer the signal electric charges of photodiode PD of each pixel P11 to P13 respectively to the floating diffusion section FD11 to FD13. Since the amount of signal electric charges then is large at the high-luminance light incident pixel P12, the electric potential VFD12 of its floating diffusion section FD12 is greatly lowered from the power supply voltage VDD. The electric potential V32 of the vertical signal line 32 to which the pixel P12 is connected, therefore, attains (VFD−VGS-M312), i.e. greatly lowered. Since a drain-source voltage of the biasing transistor M52 connected to the vertical signal line 32 is thereby made smaller, an electric current flowing through the biasing transistor M52 is reduced. A voltage drop due to GND resistance of a ground line connected in common to the sources of the biasing transistors M51 to M53 is thereby reduced so that the gate-source voltages of the biasing transistors M51, M53 connected to the vertical signal lines 31, 33 are increased so as to increase the electric currents flowing through the vertical signal lines 31, 33. The gate-source voltages of the amplification transistors M311, M313 of the pixels P11, P13 are thereby increased so that the electric potentials V31, V33 of the vertical signal lines 31, 33 are lowered by ΔV in relation to a reset level output (VDD).

(4): In a subsequent signal sampling period T4, the difference between a reset potential and a potential of reading light signal after transfer on the vertical signal lines 31 to 33 is outputted as image signal through the column select transistor M6 and the output amplifier 5 by means of a processing operation of the CDS circuit 10. At this time, a difference in potential ΔV from the reset level is detected at the pixels P11, P13 located on the periphery of the high-luminance light incident pixel P12 due to change in electric current through the ground line connected to the biasing transistor M52 as described; this then results in a white float-like image and the highlight transverse stripe phenomenon occurs in the image signals.

In this manner, when an image of a window chart is taken with a MOS image sensor, images as shown in FIGS. 4B to 4D are to be obtained due to the black sun phenomenon and the highlight transverse stripe phenomenon. FIG. 4A shows an object pattern having a high-luminance light at its center; FIG. 4B shows the manner of an occurrence of the black sun phenomenon due to change in reset potential; FIG. 4C shows the manner of an occurrence of the highlight transverse stripe phenomenon due to signal potential change; and FIG. 4D shows the manner of an occurrence of the black sun phenomenon and the highlight transverse stripe phenomenon in combination.

A method as shown in the following has been proposed in Japanese Patent Application Laid-Open 2007-20156 as method for preventing an occurrence of the black sun phenomenon and the highlight transverse stripe phenomenon in the above described MOS image sensor. Particularly in the proposed method, as shown in FIG. 5, clip circuits 71 to 73 capable of limiting the electric potential of the vertical signal line selectively to a first and to a second electric potential are provided respectively on each vertical signal line 31 to 33, whereby control is correspondingly effected so as not to bring a pixel output after reset of pixel to a level lower than the first potential and not to bring a pixel output after transfer of signal electric charges to a level lower than the second potential. It should be noted that the clip circuits 71 to 73 respectively include a clip transistor M71 to M73 and a clip select transistor M81 to M83. The gate of the clip transistor M71 to M73 is then connected to a clip voltage Vclip and the drain to a power supply voltage VDD; a clip select pulse φROWD is applied on the gate of the clip select transistor M81 to M83 and the source thereof is connected to the vertical signal line 31 to 33. The clip voltage Vclip and the clip select pulse φROWD are to be outputted from a timing control circuit 6.

An operation of the MOS image sensor provided with thus constructed clip circuits will now be described by way of a timing chart shown in FIG. 6. In this case, too, it is supposed that a high-luminance light is incident on the pixel P12 and that light is scarcely incident on the pixels P11, P13 of its periphery.

(1): At first in a reset period T1, the select pulse φROW1 is driven to H level to previously set the clip voltage Vclip to a first level VclipH which is lower than the power supply voltage VDD but with which the black sun phenomenon does not occur. The reset pulse φRST1 is then driven to H Level to fix the floating diffusion section FD11, FD12, FD13 of each pixel to the power supply voltage VDD. Further, the clamp pulse φCL and the sample-and-hold pulse φSH of the CDS circuit 10 are also driven to H level.

(2): In a subsequent reset-sample period T2, the voltage VFD12 of the floating diffusion section FD12 is greatly lowered at the high-luminance light incident pixel P12 for example due to a leaking-in of electric charges from the photodiode FD. While the electric potential V32 of the vertical signal line 32 is also lowered to (VFD12−VGS-M312) if the clip circuits are not provided, the electric potential V32 (Rst) of the vertical signal line 32 is clipped at (VclipH−VGS-M72) by the clip circuit 72 and does not fall to a lower potential than that. An occurrence of the black sun phenomenon, therefore, is avoided even with a subsequent differential processing at the CDS circuit 10. It should be noted that VGS-M72 in this case is a gate-source voltage of the clip transistor M72. Toward an end period of the reset-sample period T2, then, the clamp pulse φCL is brought to L level at the CDS circuit 10 to clamp the electric potentials of each vertical signal line 31 to 33.

(3): In a subsequent signal transfer period T3, the clip voltage Vclip is switched to a second level VclipL at which the highlight transverse stripe phenomenon does not occur, and at the same time the transfer pulse φTR1 is driven to H level. The electric charges of photodiode PD of each pixel P11 to P13 are thereby transferred respectively to the floating diffusion section FD11 to FD13. At this time, since the voltage VFD12 of the floating diffusion section FD12 at the high-luminance light incident pixel P12 has already fallen in the reset-sample period T2, only a small amount of fall from the voltage in the reset-sample period is seen of its voltage Vsig even when the electric charges of the photodiode PD is transferred. While the electric potential V32(sig) of the vertical signal line 32, if not clipped, is changed to (Vsig−VGS-M312), the electric potential V32(sig) of the vertical signal line 32 is clipped at (VclipL−VGS-M72) because the second level VclipL is set at the clip circuit. A fall by ΔV from the reset level output (VDD) in the electric potentials V31, V33 of the vertical signal lines 31, 33 is thereby avoided so that an occurrence of the highlight transverse stripe is avoided.

(4): In a subsequent signal sampling period T4, a difference between the reset potential of the vertical signal line 31 to 33 and the potential of reading light signal after transfer is retained at the sample-and-hold capacitor C12 by a processing operation of the CDS circuit 10, and is then outputted through the column select transistor M6 and the output amplifier 5 as an image signal where the black sun phenomenon and the highlight transverse stripe phenomenon are prevented.

By providing clip circuit as the above, when the electric potential V32(Rst) [=(VFD12−VGS-M312)] at the time of reset of the vertical signal line 32 has become smaller than the output voltage (VclipH−VGS-M72) of clip circuit, and when the electric potential V32(sig) [=(VFD12−VGS-M312)] at the time of reading signal has become smaller than the output voltage (VclipL−VGS-M72) of clip circuit, the electric potentials of the vertical signal lines are clipped by the output voltage of the respective clip circuits so that an occurrence of the black sun phenomenon and the highlight transverse stripe phenomenon can be avoided.

SUMMARY OF THE INVENTION

In a first aspect of the invention, there is provided a solid-state imaging apparatus including: a pixel section having a plurality of pixels two-dimensionally arranged into a matrix, each pixel containing a photoelectric conversion section for converting an incident light into signal electric charges, an accumulation section for accumulating the signal electric charges generated at the photoelectric conversion section, an amplification section for amplifying and outputting onto an output signal line the signal electric charges accumulated at the accumulation section, and a reset section for resetting the accumulation section to a reset potential set on a reset line; a load section connected at one end thereof to the output signal line and grounded at the other end for making constant an electric current flowing through the amplification section; a noise suppressing section connected to the output signal line using a first signal being an output from the pixel at the time of resetting by the reset section to effect a noise suppressing operation where noise components contained in a second signal corresponding to the signal electric charges are suppressed; and a control section for, of the outputs onto the output signal line of a first pixel being subject of the noise suppressing operation, respectively limiting the first signal and the second signal to a first electric potential and to a second electric potential with using an output resulting from operation by the reset section onto the output signal line from a second pixel different from the first pixel and connected to the same one output signal line as the first pixel.

In a second aspect of the invention, the second pixel for use in limiting to the first electric potential and one for use in limiting to the second electric potential in the solid-state imaging apparatus according to the first aspect are the same one pixel.

In a third aspect of the invention, the second pixel for use in limiting to the first electric potential and one for use in limiting to the second electric potential in the solid-state imaging apparatus according to the first aspect are different pixels.

In a fourth aspect of the invention, the second pixel for use in limiting to the first electric potential and to the second electric potential in the solid-state imaging apparatus according to any one of the first to third aspects is a pixel located near the first pixel.

In a fifth aspect of the invention, the control section in the solid-state imaging apparatus according to any one of the first to fourth aspects sets as the second electric potential an electric potential with which the load section is not turned OFF.

In a sixth aspect of the invention, the control section in the solid-state imaging apparatus according to any one of the first to fifth aspects sets the first electric potential to a level higher than the second electric potential.

In a seventh aspect of the invention, the reset line in the solid-state imaging apparatus according to any one of the first to sixth aspects is changeable with respect to the reset potential by the unit of row by the control section and the control section makes variable the reset potential of the reset line associated with pertinent ones of the pixels in accordance with a location of the second pixel for use in setting the first electric potential and the second electric potential.

In an eighth aspect of the invention, the reset line in the solid-state imaging apparatus according to any one of the first to sixth aspects is made capable of variably supplying a common reset potential to all the pixels by the control section, and the control section controls the reset section so as to avoid an overlap of timings for applying respective reset potentials to the first pixel and to the second pixel.

In a ninth aspect of the invention, the solid-state imaging apparatus according to any one the first to eighth aspects further includes a mode setting section for setting one operation mode selected from a plurality of operation modes associated with image taking, wherein the control section causes a limiting operation to the first electric potential differently in accordance with a set operation mode.

In a tenth aspect of the invention, the limiting operation caused by the control section in the solid-state imaging apparatus according to the ninth aspect is only of the second signal to the second electric potential when an operation mode where the incident light entering the photoelectric conversion section is cut off is set as the set operation mode after accumulation of the signal electric charges at the photoelectric conversion section.

BRIEF DESCRIPTION OF THE DRAWINGS

FIG. 15 is a timing chart for explaining operation of the solid-state imaging apparatus according to a fifth embodiment of the invention.

DESCRIPTION OF THE PREFERRED EMBODIMENTS

Some embodiments of the solid-state imaging apparatus according to the invention will be described below with reference to the drawings.

Embodiment 1

The outline of the first embodiment will first be described. In the present invention, clip operation of vertical signal lines for preventing the black sun phenomenon and the highlight transverse stripe phenomenon is effected with using an output of pixel in pixel section without providing a separate clip circuit. The first embodiment uses a pixel row adjacent to pixel row which is being read (i.e. in the course of CDS operation) as the pixel row for generating clip voltage to be provided onto the vertical signal line, and, then, a voltage VFD of the floating diffusion section of the pixels of such pixel row is changed between a reset sampling period and a signal sampling period; the electric potential of the vertical signal line is clipped with using such floating diffusion section voltage VFD. It is to thereby suppress both the black sun phenomenon and the highlight transverse stripe phenomenon, with also moving the clip voltage generating pixel row in accordance with moving of the pixel row to be read out.

Figure 1:
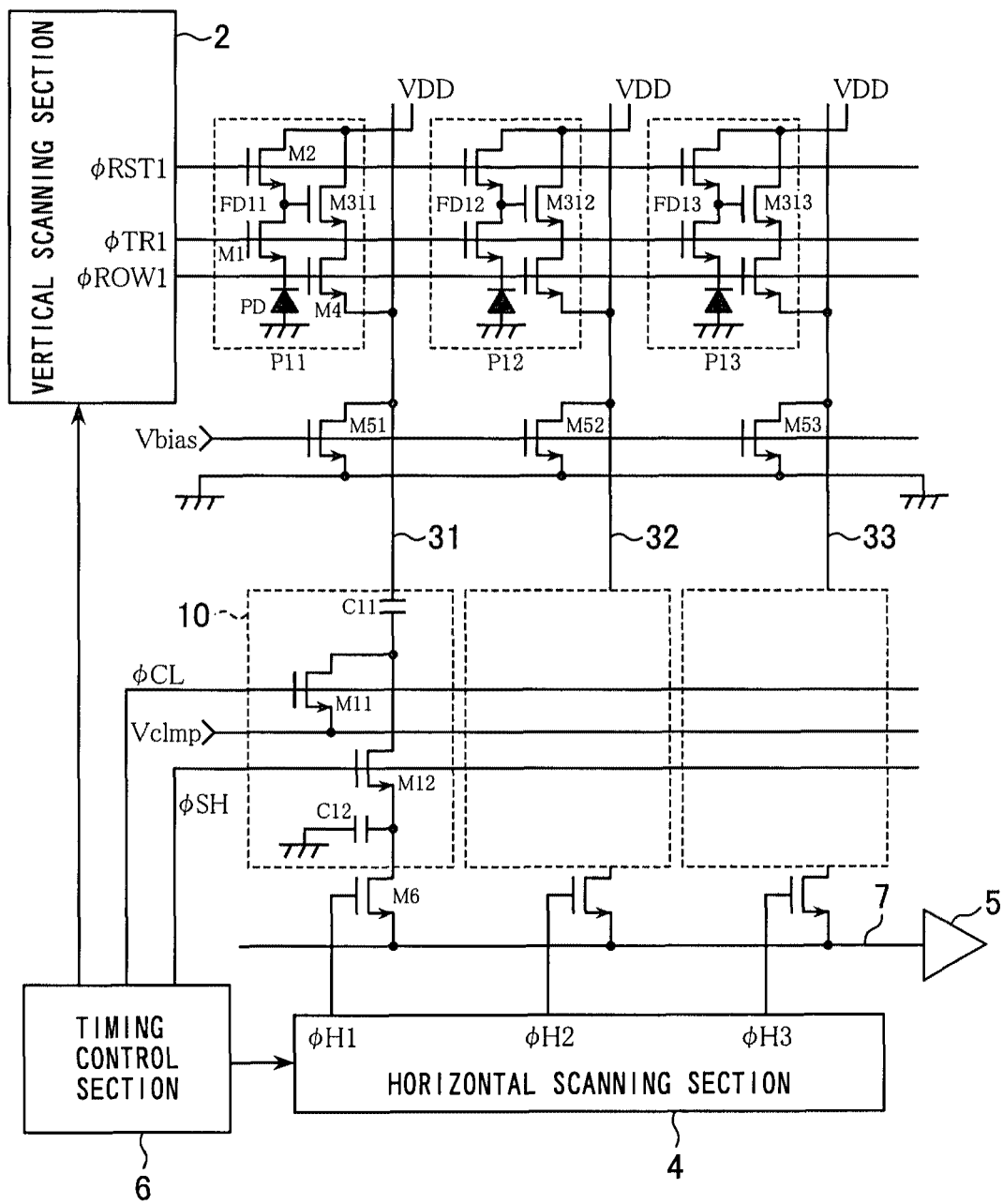
FIG. 1 is a circuit diagram showing construction of a general MOS type image sensor.
Figure 2:
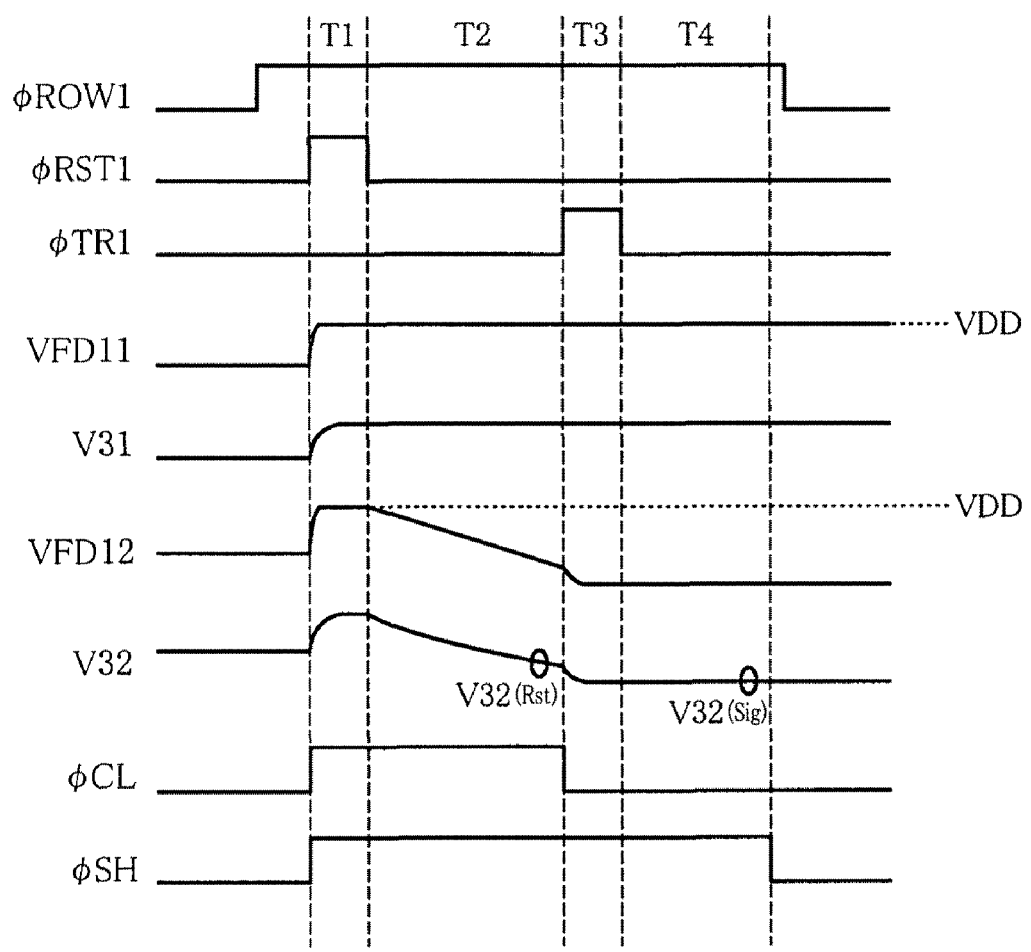
FIG. 2 is a timing chart for explaining the manner of an occurrence of the black sun phenomenon in the MOS image sensor shown in FIG. 1.
Figure 3:
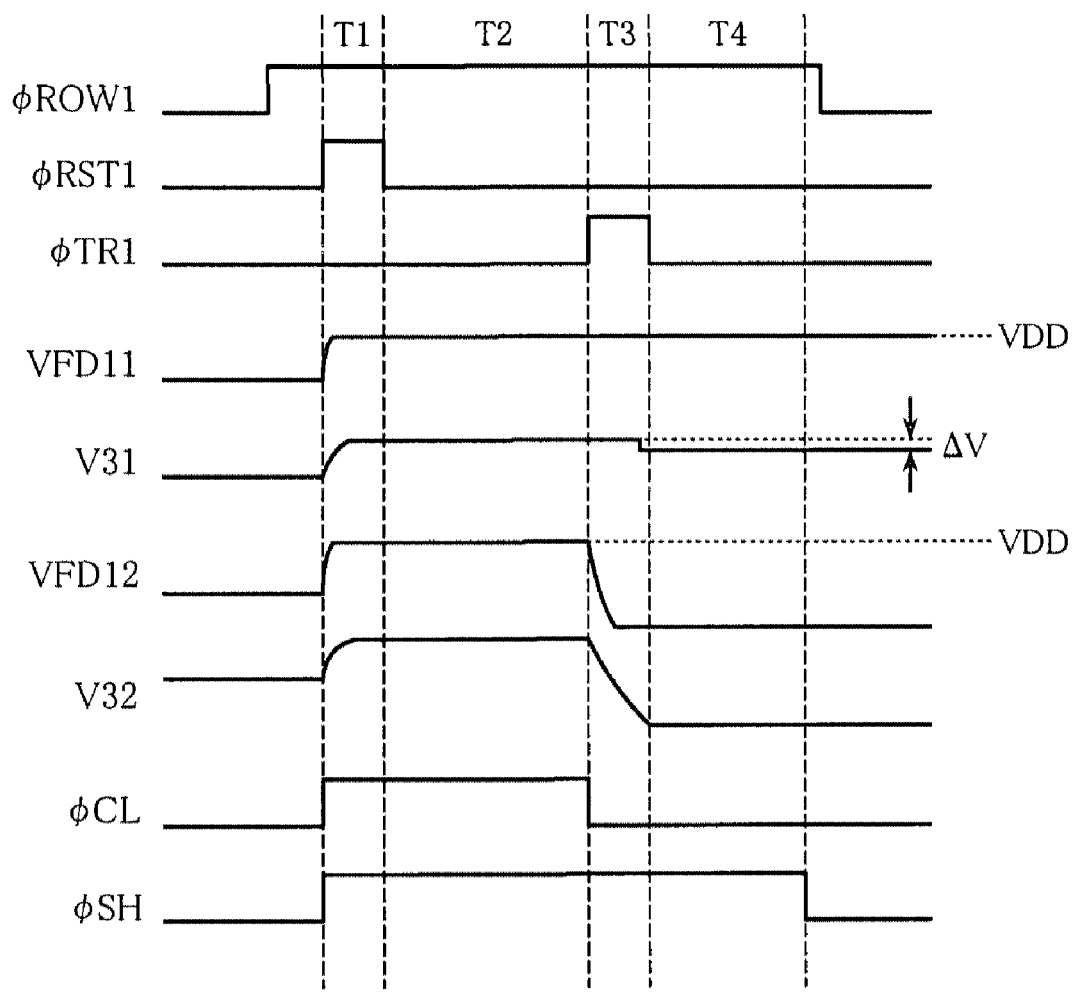
FIG. 3 is a timing chart for explaining the manner of an occurrence of the highlight transverse stripe phenomenon in the MOS image sensor shown in FIG. 2.
Figure 4A:
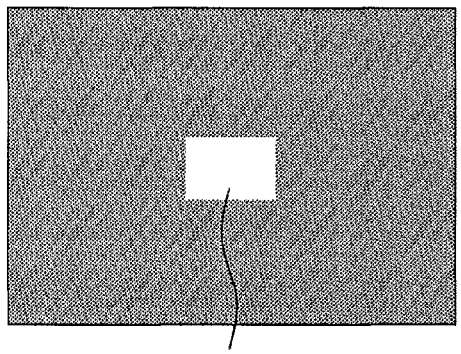
FIGS. 4A to 4D typically illustrate an object pattern having a high-luminance light at its center, and the manners of a frame where the black sun phenomenon and/or the highlight transverse stripe phenomenon occur in the MOS image sensor shown in FIG. 2.
Figure 4B:
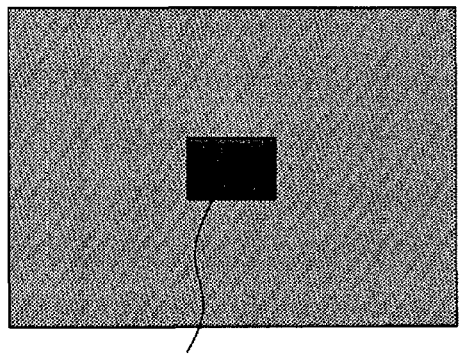
Figure 4C:
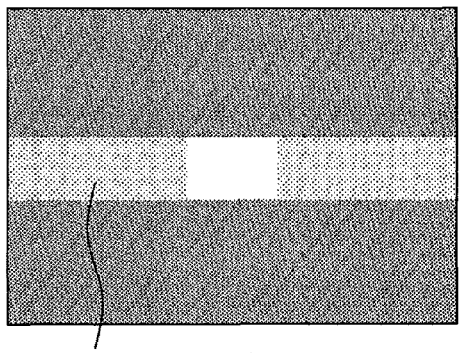
Figure 4D:
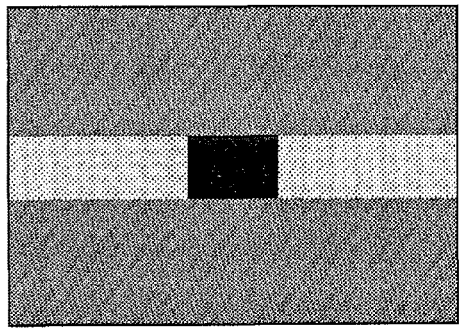
Figure 5:
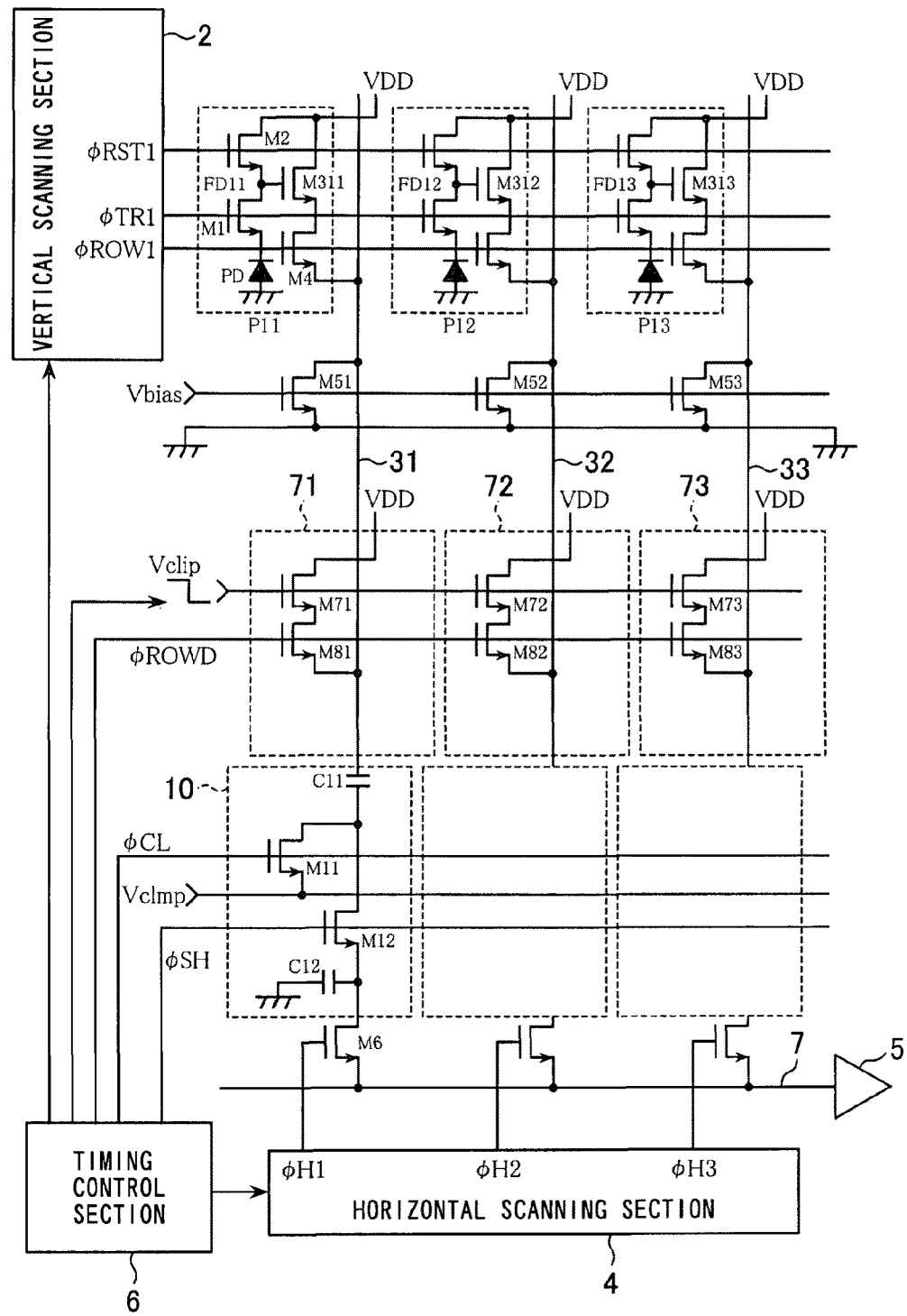
FIG. 5 is a circuit diagram showing construction of a prior-art MOS image sensor having a clip circuit.
Figure 6:
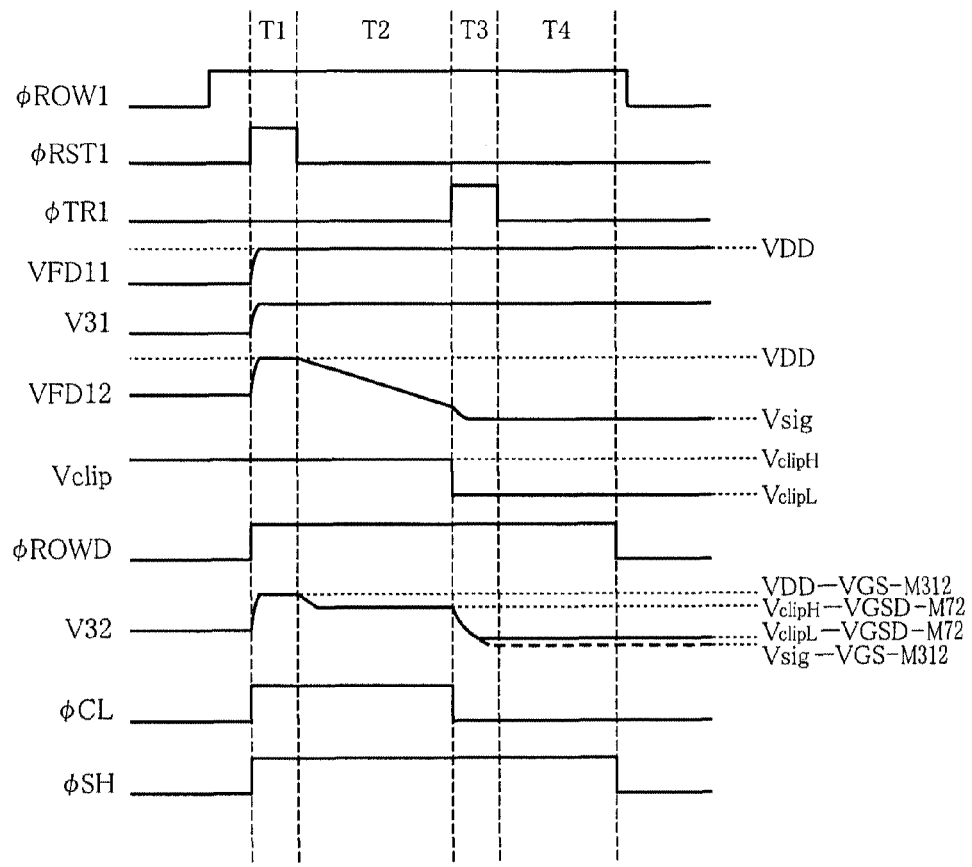
FIG. 6 is a timing chart for explaining operation of the MOS image sensor shown in FIG. 5.
Figure 7:
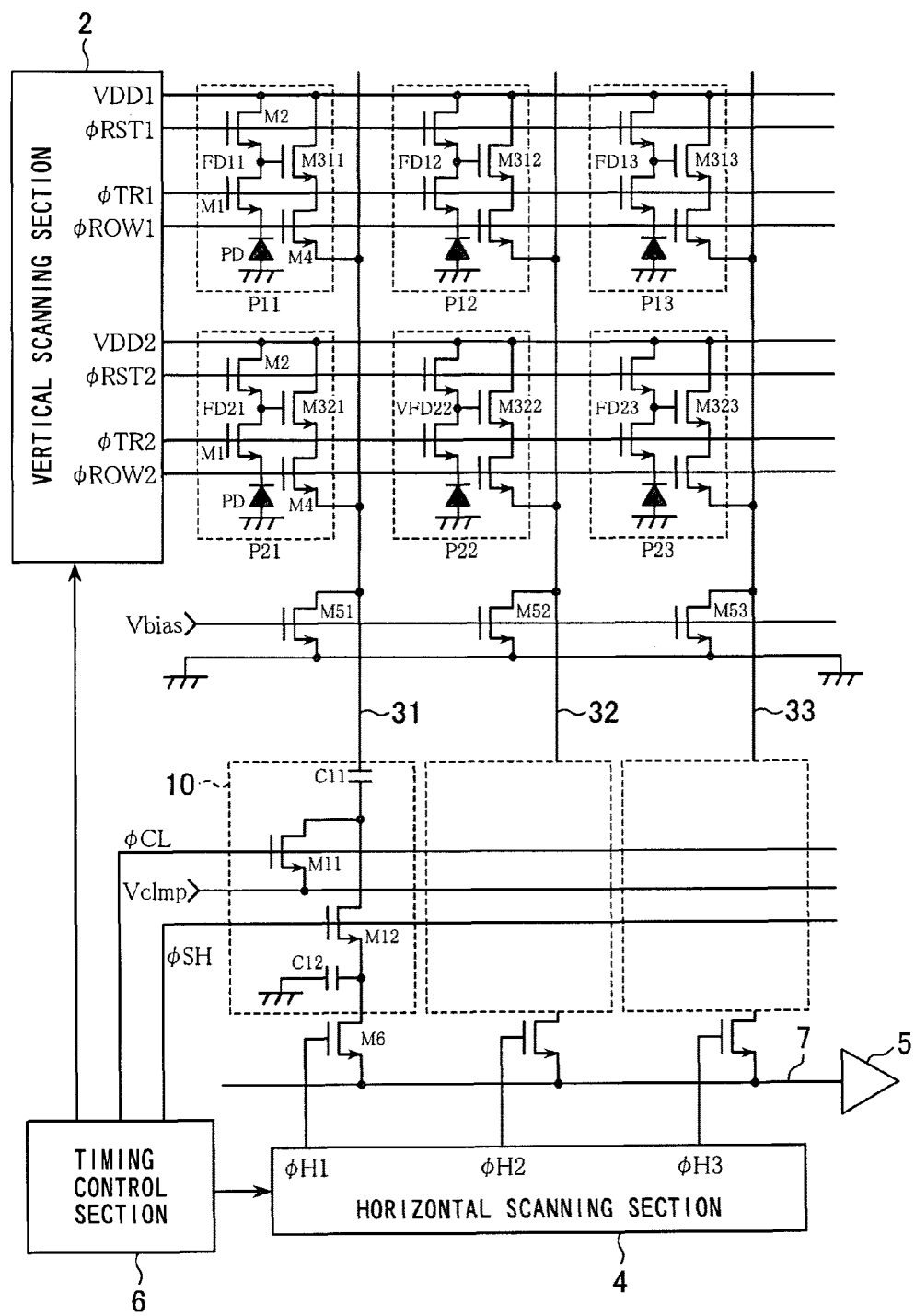
FIG. 7 is a circuit diagram showing construction according to a first embodiment of the solid-state imaging apparatus according to the present invention.

The construction of the first embodiment will now be described. FIG. 7 is a circuit diagram showing the solid-state imaging apparatus according to the first embodiment, where like or corresponding components as in the prior-art example shown in FIG. 1 are denoted by like reference symbols and a description thereof will be partially omitted. In the solid-state imaging apparatus according to this embodiment, too, while a pixel section is constructed by two-dimensionally arranging a plurality of pixels, only the pixels P11 to P23 arranged into 2 rows by 3 columns are shown here for ease of explanation. It is then supposed that the pixels P11 to P13 of the first row represent the pixels of a pixel row to be read out and that the pixels P21 to P23 of the second row represent the pixels of a clip voltage generating pixel row. Each pixel P11 to P23 respectively includes: a photodiode PD; a floating diffusion section FD11 to FD23 having electrostatic capacitance; a transfer transistor M1; a reset transistor M2; an amplification transistor M311 to M323; and a select transistor M4. Those of the pixels P11 to P23 arranged in column directions are respectively connected in common to vertical signal lines 31, 32, 33, and the vertical signal lines 31 to 33 are respectively connected to a CDS circuit 10. Further, one end of a biasing transistor M51 to M53 serving as constant current supply having the other end grounded is respectively connected to the vertical signal line 31 to 33, and each biasing transistor M51 to M53 is controlled by a bias current regulating voltage Vbias.

The CDS circuit 10 includes: a clamp transistor M11; a sample-and-hold transistor M12; a clamp capacitor C11; and a sample-and-hold capacitor C12. The CDS circuit 10 is connected to a horizontal signal line 7 through a column select transistor M6 so as to output image signal through an output amplifier 5. Transfer pulses φTR1, φTR2, reset pulses φRST1, φRST2, row select pulses φROW1, φROW2 associated with control of the transfer transistor M1, reset transistor M2 and select transistor M4 within pixel, and column select pulse φH1 to φH3 associated with control of the column select transistor M6 are outputted respectively from a vertical scanning section 2 and a horizontal scanning section 4 under control of a timing control section 6. Further, a pixel power supply VDD1 to the pixels P11 to P13 of the first row is fixed to a power supply voltage VDD, while on the other hand a pixel power supply VDD2 to the pixels P21 to P23 of the second row is made switchable through the vertical scanning section 2 by the timing control section 6 between a first clip voltage VclipH lower by a small amount than the power supply voltage VDD with which the black sun phenomenon does not occur and a second clip voltage VclipL lower than the first clip voltage VclipH with which the highlight transverse stripe phenomenon does not occur. Further, a clamp pulse φCL and a sample-and-hold pulse φSH associated with control of the clamp transistor M11 and the sample-and-hold transistor M12 are outputted from the timing control section 6.

Figure 8:
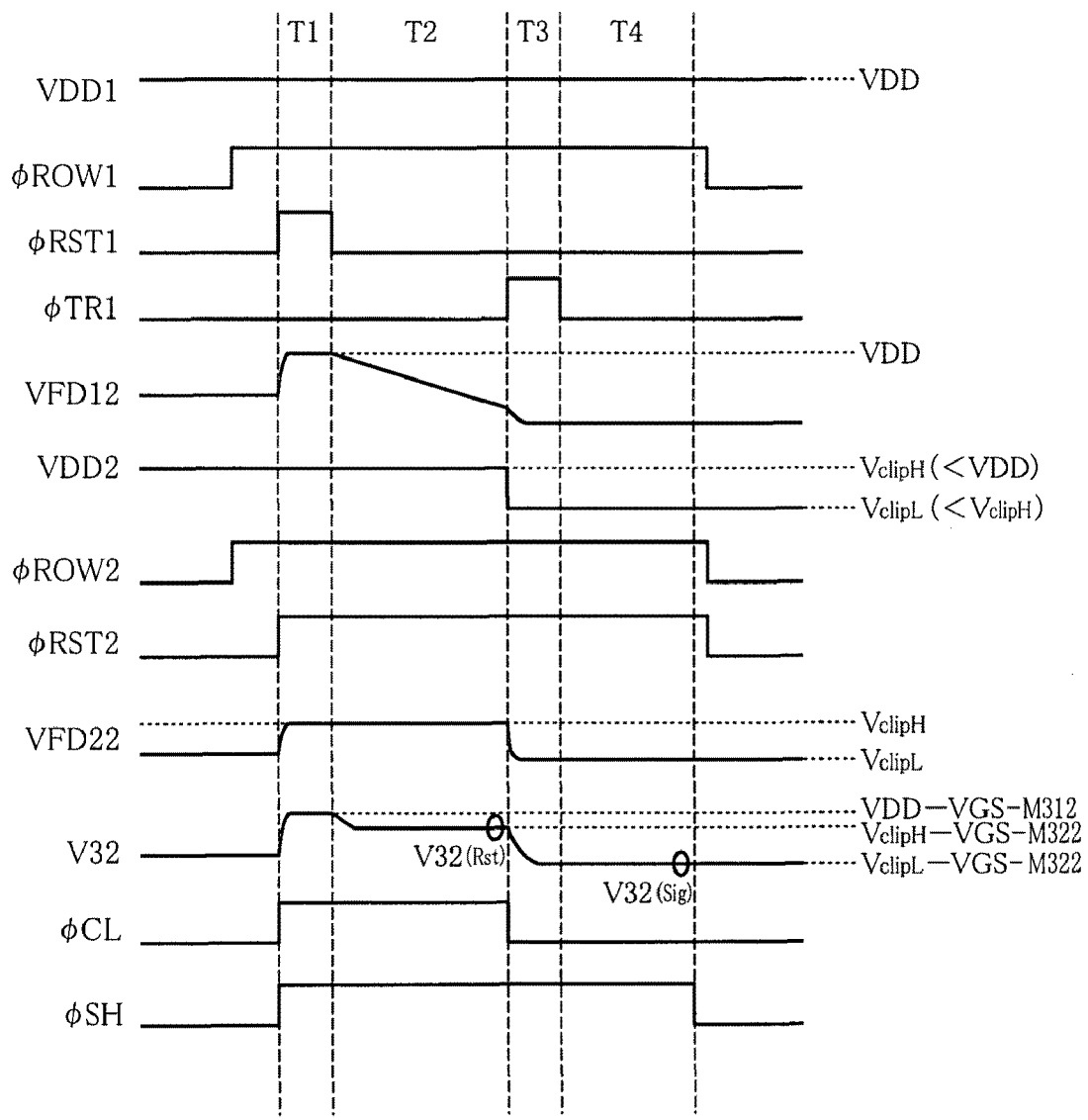
FIG. 8 is a timing chart for explaining operation of the solid-state imaging apparatus according to the first embodiment shown in FIG. 7.

An operation of thus constructed solid-state imaging apparatus according to the first embodiment will now be described by way of a timing chart shown in FIG. 8. A description will be given below on an assumption that a high-luminance light is incident on the pixel P12 and that light is scarcely incident on the rest of the pixels and with focus on the operation of a pixel column of the second column.

(1): At first in a FD section reset period T1, the select pulses φROW1, φROW2 of two rows are driven to H level, whereby pixel outputs of the two rows are connected to the vertical signal line 32 so as to form a differential input circuit, and the pixel power supply VDD2 of the second row is previously set to the first clip voltage VclipH. In this condition, the reset pulses φRST1, φRST2 of the two rows are driven to H level. The voltage VDF12 of the floating diffusion section FD12 of the pixel P12 of the row to be read out of the first row is thereby fixed to the power supply voltage VDD, while, on the other hand, the voltage VFD22 of the floating diffusion section FD22 of the clip voltage generating pixel P22 in the second row is fixed to the first clip voltage VclipH. An electric potential V32 of the vertical signal line 32 thereby attains (VDD−VGS-M312). Further, the clamp pulse φCL and the sample-and-hold pulse φSH of the CDS circuit 10 are also driven to H level. It should be noted that VGS-M312 refers to a gate-source voltage of the amplification transistor M312 of the pixel P12.

(2): In a subsequent reset-sampling period T2, the reset pulse φRST1 of the first row is brought to L level while keeping the reset pulse φRST2 of the second row at H level. The voltage VDF12 of the floating diffusion section FD12 of the pixel P12 of the first row falls as shown in the figure for example because of a leaking-in of electric charges from the photodiode PD due to the incidence of a high-luminance light. At the clip voltage generating pixel P22 of the second row, on the other hand, since the reset pulse φRST2 remains at H level, the voltage VFD22 of the floating diffusion section FD22 remains fixed at the first clip voltage VclipH. The electric potential V32(Rst) of the vertical signal line 32 is therefore clipped at (VclipH−VGS-M322), whereby it is ready to suppress the occurrence of the black sun phenomenon due to differential processing at the CDS circuit 10 which is to be performed next. It should be noted that VGS-M322 is a gate-source voltage of the amplification transistor M322 of the pixel P22. In an end period of the reset-sampling period T2, then, the clamp pulse φCL is brought to L level to clamp the potential V32(Rst) (=VclipH−VGS-M322) of the vertical signal line 32 to the CDS circuit 10.

(3): In a subsequent transfer period T3, the transfer pulse φTR1 of the pixel row of the first row is driven to H level while keeping the reset pulse φRST2 of the clip voltage generating pixels of the second row at H level. The voltage VFD12 of the floating diffusion section FD12 of the pixel P12 of the first row (row to be read out) is thereby lowered in voltage due to an accumulated electric charges of the photodiode PD. Further, the pixel power supply VDD2 of the clip voltage generating pixel P22 of the second row is switched to a second clip voltage VclipL to thereby switch and fix the voltage VFD22 of the floating diffusion section FD22 of the pixel P22 to the second clip voltage VclipL.

(4): In a subsequent signal sampling period T4, the transfer pulse φTR1 of the pixel row of the first row is brought to L level while keeping the reset pulse φRST2 of the pixel row of the second row at H level. At this stage, although the voltage VFD12 of the floating diffusion section FD12 of the pixel P12 of the first row falls to a level at which the highlight transverse stripe occurs, since the voltage VFD22 of the floating diffusion section FD22 of the clip voltage generating pixel P22 of the second row is fixed at the second clip voltage VclipL, the potential V32(Sig) of the vertical signal 32 is clipped to (VclipL−VGS-M322) so that change in the pixel bias current can be avoided. The highlight transverse stripe phenomenon is thereby suppressed.

Subsequently, the difference between a reset potential of the vertical signal line 31 to 33 and a potential of reading light signal after transfer is retained at the sample-and-hold capacitor C12 by a processing operation of the CDS circuit 10. This difference is then outputted through the column select transistor M6 and the output amplifier 5 as an image signal where the black sun phenomenon and the highlight transverse stripe phenomenon are prevented. The image signals of one frame are thereafter obtained by repeating similar operation with changing the row to be read out and, in addition, with also changing the clip voltage generating row correspondingly to such change.

As the above, in the present embodiment, the electric potential V32 (VFD12−VGS-M312) of the vertical signal line 32 is clipped when (VFD12−VGS-M312)<(VclipH−VGS-M322) is attained at the time of resetting [V32(Rst)] or when (VFD12−VGS-M312)<(VclipL−VGS-M322) at the time of reading signal [V32(Sig)]. Since the amplification transistor of the pixel P12 of the first row and the amplification transistor of the clip voltage generating pixel P22 of the second row have the same size and same characteristic as they are the transistors of adjacent pixels in the same one pixel section, a variance is small between the gate-source voltage VGS-312 of the amplification transistor M312 of the pixel P12 of the first row and the gate-source voltage VGS-M322 of the amplification transistor M322 of the clip voltage generating pixel P22 of the second row. It is therefore possible to reduce the variance of clip voltage so as to reduce a variance in action for suppressing an occurrence of the black sun phenomenon and the highlight transverse stripe phenomenon.

Embodiment 2

A second embodiment of the invention will now be described. In this embodiment, two pixel rows adjacent to the pixel row being read (in the course of CDS operation) are used as the pixel row for generating clip voltage, and the floating diffusion sections FD of the pixels of these two pixel rows are imparted with a different FD level from each other. Such different FD levels are used as switched between a reset-sampling period and a signal sampling period to suppress both the black sun phenomenon and the highlight transverse stripe phenomenon.

Figure 9:
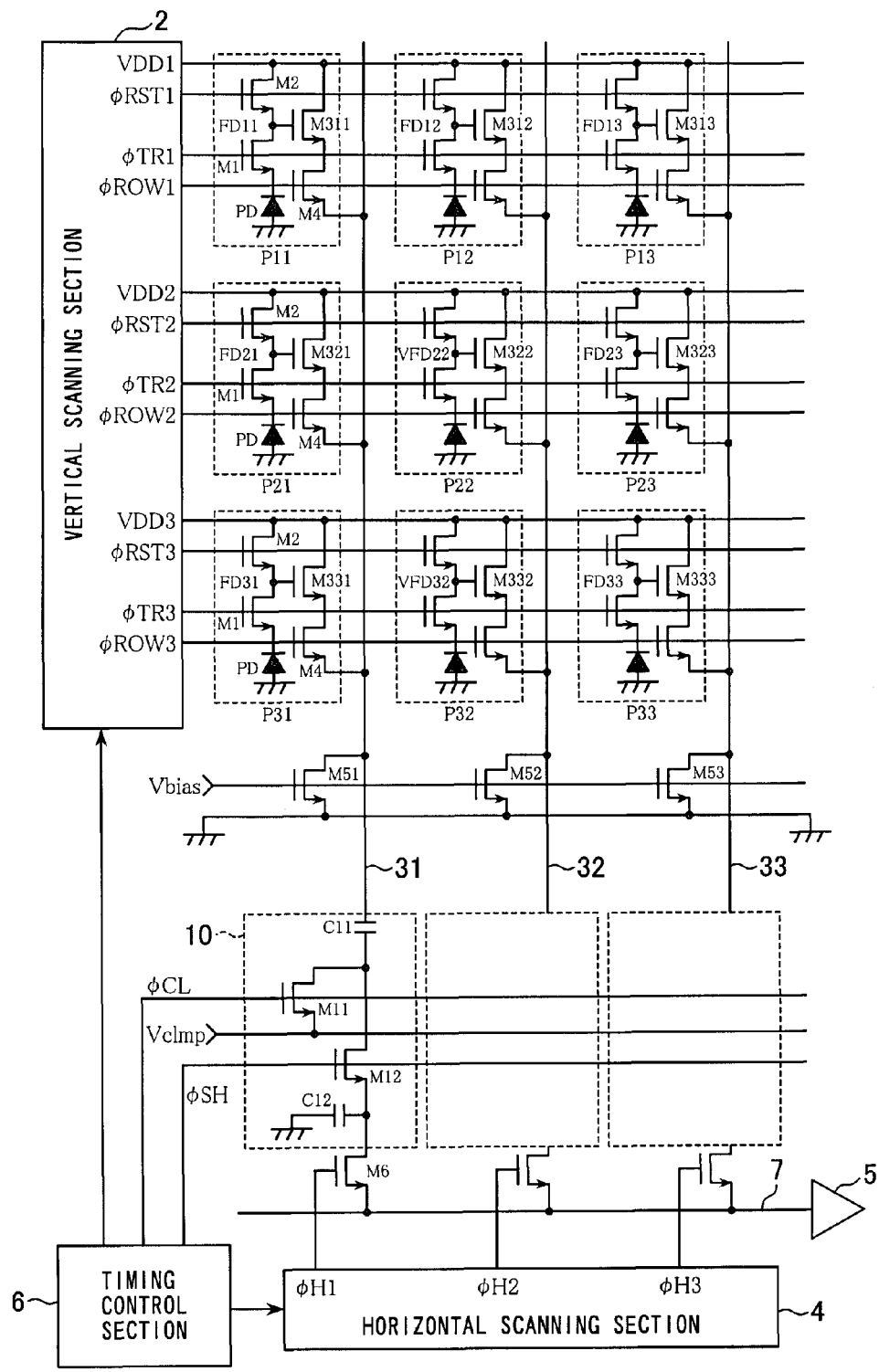
FIG. 9 is a circuit diagram showing construction of the solid-state imaging apparatus according to a second embodiment of the invention.

FIG. 9 is a circuit diagram showing a specific example of the construction of the second embodiment, where like or corresponding components as in the first embodiment shown in FIG. 7 are denoted by like reference symbols and a description thereof will be partially omitted. Here, only a 3-row by 3-column portion is shown for ease of explanation as a pixel section where pixels are two-dimensionally arranged. Shown here is a case where the pixels P11 to P13 of the first row are determined as the pixel to be read out, and the pixels P21 to P23 of the second row are used as the pixels for generating clip voltage to prevent the black sun phenomenon and the pixels P31 to P33 of the third row as the pixels for generating clip voltage to prevent the highlight transverse stripe phenomenon. In this case, then, a pixel power supply VDD1 to the pixels P11 to P13 of the first row is fixed to a power supply voltage VDD; a pixel power supply VDD2 to the pixels P21 to P23 of the second row is fixed to a first clip voltage VclipH which is somewhat lower than the power supply voltage VDD and with which the black sun phenomenon does not occur; and a pixel power supply VDD3 to the pixels P31 to P33 of the third row is fixed to a second clip voltage VclipL which is lower than the first clip voltage VclipH and with which the highlight transverse stripe phenomenon does not occur.

Figure 10:
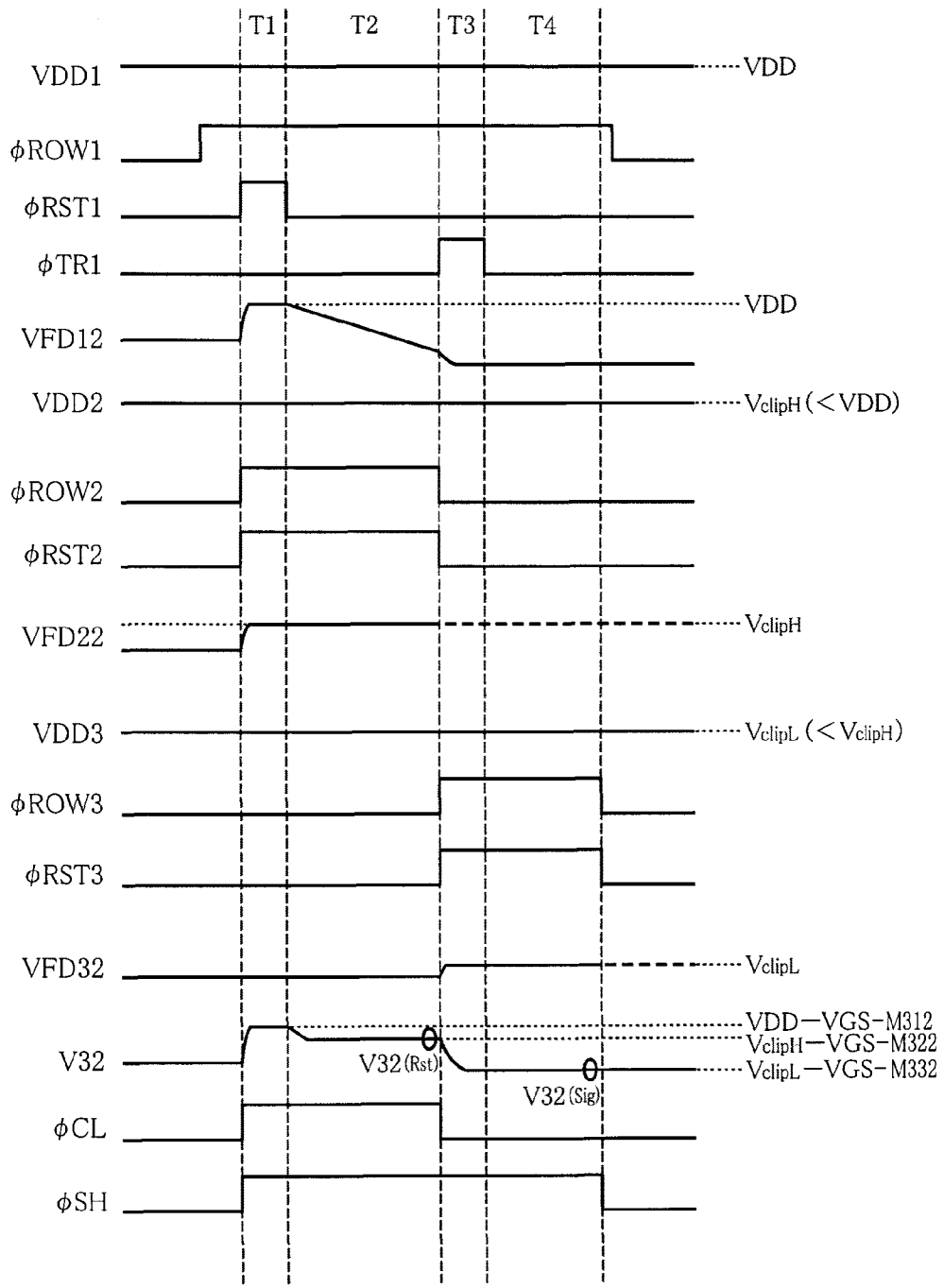
FIG. 10 is a timing chart for explaining operation of the solid-state imaging apparatus according to the second embodiment shown in FIG. 9.

An operation of thus constructed solid-state imaging apparatus according to the second embodiment will now be described by way of a timing chart shown in FIG. 10. A description will be given below with focusing on the operation of a pixel column of the second column on an assumption that a high-luminance light is incident on the pixel P12 and that light is scarcely incident on the rest of the pixels.

(1): At first in a FD section reset period T1, the select pulses φROW1, φROW2 of two rows are driven to H level, whereby pixel outputs of the two rows are connected to the vertical signal line 32 so as to form a differential input circuit. In this condition, the reset pulses φRST1, φRST2 of the two rows are driven to H level. The voltage VDF12 of the floating diffusion section FD12 of the pixel P12 of the row to be read out of the first row is thereby fixed to the power supply voltage VDD, and the voltage VFD 22 of the floating diffusion section FD22 of the black sun phenomenon preventing clip voltage generating pixel P22 of the second row is fixed to the first clip voltage VclipH. The electric potential V32 of the vertical signal line 32 thereby attains (VDD−VGS-M312). Further, the clamp pulse φCL and the sample-and-hold pulse φSH of the CDS circuit 10 are also driven to H level.

(2): In a subsequent reset-sampling period T2, the reset pulse φRST1 of the first row is brought to L level while keeping the reset pulse φRST2 of the second row at H level. The voltage VDF12 of the floating diffusion section FD12 of the pixel P12 of the first row falls as shown in the figure for example because of a leaking-in of electric charges from the photodiode PD due to the incidence of a high-luminance light. At the black sun phenomenon preventing clip voltage generating pixel P22 of the second row, on the other hand, since the reset pulse φRST2 remains at H level, the voltage VFD22 of the floating diffusion section FD22 remains fixed at the first clip voltage VclipH. The electric potential V32 (Rst) of the vertical signal 32 is therefore clipped at (VclipH−VGS-M322) so as to be ready for suppression of an occurrence of the black sun phenomenon due to differential processing at the CDS circuit 10 which is to be performed next. It should be noted that VGS-M322 is a gate-source voltage of the amplification transistor M322 of the pixel P22. In an end period of the reset-sampling period, then, the clamp pulses CL is brought to L level to clamp the potential V32 (Rst) (=VclipH−VGS-M322) of the vertical signal line 32 to the CDS circuit 10.

(3): In a subsequent transfer period T3, the transfer pulse φTR1 of the pixel row of the first row is driven to H level. The voltage VFD12 of the floating diffusion section FD12 of the pixel 12 of the first row (row to be read out) thereby falls due to an accumulated electric charges of the photodiode PD. Further, the select pulse φROW2 and the reset pulse φRST2 of the black sun phenomenon preventing clip voltage generating pixel of the second row are brought to L level, and at the same time the select pulse φROW3 of the highlight transverse stripe preventing clip voltage generating pixel of the third row is driven to H level. The pixel outputs of the pixel row to be read out of the first row and of the highlight transverse stripe preventing clip voltage generating pixel row of the third row are thereby connected to the vertical signal line 32 so as to form a differential input circuit. Further, the reset pulse φRST3 of the highlight transverse stripe preventing clip voltage generating pixel row of the third row is driven to H level. The voltage VFD32 of the floating diffusion section FD32 of the pixel P32 of the third row is thereby switched to and fixed at the second clip voltage VclipL.

(4): In a subsequent signal sampling period T4, the transfer pulse φTR1 of the pixel row of the first row is brought to L level while keeping the reset pulse φRST3 of the pixel row of the third row at H level. At this stage, although the voltage VFD12 of the floating diffusion section FD12 of the pixel P12 of the first row falls to a level at which the highlight transverse stripe occurs, since the voltage VFD32 of the floating diffusion section FD32 of the highlight transverse stripe preventing clip voltage generating pixel P32 of the third row is fixed at the second clip voltage VclipL, the electric potential V32 (Sig) of the vertical signal line 32 is clipped to (VclipL−VGS-M332). It is thereby possible to avoid a change in the pixel bias current so that the highlight transverse stripe phenomenon is suppressed. It should be noted that VGS-M332 is a gate-source voltage of the amplification transistor M332 of the pixel 32.

(5): Subsequently, a difference between a reset potential and a potential of reading light signal after transfer of the vertical signal line 31 to 33 is retained at the sample-and-hold capacitor C12 by a processing operation of the CDS circuit 10. Such difference is then outputted through the column select transistor M6 and the output amplifier 5 as an image signal where the black sun phenomenon and the highlight transverse stripe phenomenon are prevented. The image signals of one frame are obtained by thereafter repeating similar operation with changing the pixel row to be read out and, in addition, with also changing correspondingly to such change the black sun phenomenon preventing clip voltage generating pixel row and the highlight transverse stripe preventing clip voltage generating pixel row.

As the above, in the present embodiment, the electric potential V32 (VFD12−VGS-M312) of the vertical signal line 32 is clipped when (VFD12−VGS-M312)<(VclipH−VGS-M322) is attained at the time of resetting [V32(Rst)] or when (VFD12−VGS-M312)<(VclipL−VGS-M322) at the time of reading signal [V32(Sig)]. Since the amplification transistor of the pixel P12 of the first row, the amplification transistor of the black sun phenomenon preventing clip voltage generating pixel P22 of the second row, and the amplification transistor of the highlight transverse stripe preventing clip voltage generating pixel P32 of the third row have the same size and same characteristic as they are the transistors of adjacent pixels of the same one pixel section, a variance is small among the gate-source voltage VGS-M312 of the amplification transistor M312 of the pixel P12 of the first row, the gate-source voltage VGS-M322 of the amplification transistor M322 of the black sun phenomenon preventing clip voltage generating pixel P22 of the second row, and the gate-source voltage VGS-M332 of the highlight transverse stripe preventing clip voltage generating pixel M332 of the third row. It is therefore possible to reduce the variance of clip voltage so as to reduce a variance in action for suppressing an occurrence of the black sun phenomenon and the highlight transverse stripe phenomenon. Further, it is necessary in the first embodiment to switch the clip voltages in a short time span, since the first clip voltage for preventing the black sun phenomenon and the second clip voltage for preventing the highlight transverse stripe are to be generated with using a pixel in a single one pixel row. In the present embodiment, on the other hand, since the first and second clip voltages are generated at separate pixels, an advantage is obtained that the control becomes simpler.

Embodiment 3

A third embodiment of the invention will now be described. In the third embodiment, the timing of resetting each pixel is changed between the pixel row to be read out and the pixel row for generating clip voltage, and a pixel power supply VDD1 is driven in a manner of pulse so as to set the voltage of the pixel power supply of the clip voltage generating pixel row to a first clip voltage VclipH or to a second clip voltage VclipL.

Figure 11:
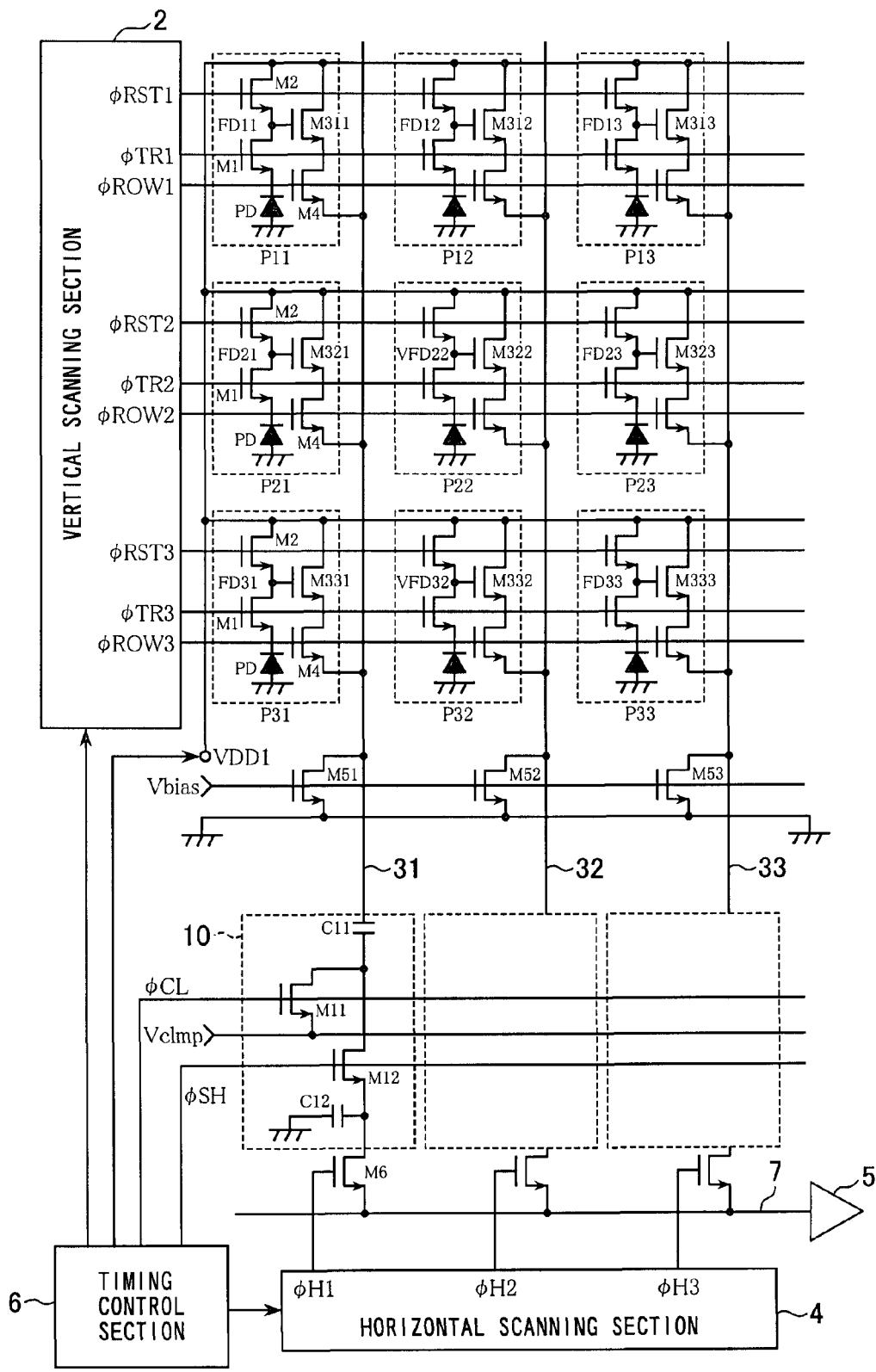
FIG. 11 is a circuit diagram showing construction of the solid-state imaging apparatus according to a third embodiment of the invention.

FIG. 11 is a circuit diagram showing a specific construction of the third embodiment, where like or corresponding components as in the first or second embodiment shown in FIG. 7 or 9 are denoted by like reference symbols and a description thereof will be partially omitted. Here, only a 3-row by 3-column portion is shown for ease of explanation as a pixel section having two-dimensionally arranged pixels, showing a case where the pixels P11 to P13 of the first row are supposed as pixels to be read out, and the pixels P21 to P23 of the second row are used as pixels for generating clip voltage. A pixel power supply VDD1 to each pixel row is driven in a manner of pulse to a power supply voltage VDD, to a first clip voltage VclipH, and to a second clip voltage VclipL.

Figure 12:
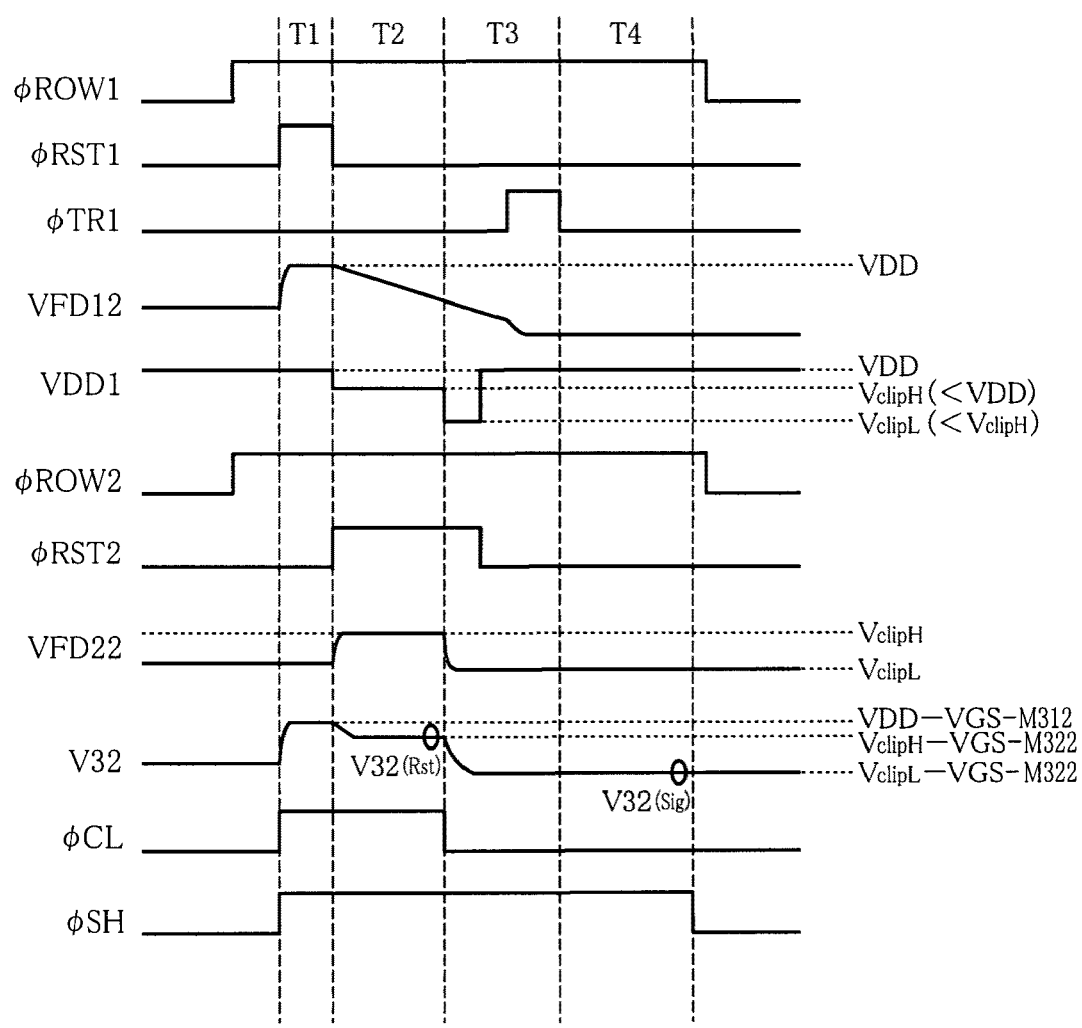
FIG. 12 is a timing chart for explaining operation of the third embodiment shown in FIG. 11.

An operation of thus constructed solid-state imaging apparatus according to the third embodiment will now be described by way of a timing chart shown in FIG. 12. In this case, too, a description will be given with focusing on the operation of a pixel column of the second column on an assumption that a high-luminance light is incident on the pixel P12 and that light is scarcely incident on the rest of the pixels.

(1): At first in a FD section reset period T1 of the pixel row of the first row, the select pulses φROW1, φROW2 of two rows are driven to H level, whereby pixel outputs of the two rows are connected to the vertical signal line 32 so as to form a differential input circuit. In this condition, the pixel power supply VDD1 is set to a power supply voltage VDD, and the reset pulse φRST1 of the first row is driven to H level. The voltage VDF12 of the floating diffusion section FD12 of the pixel P12 of the row to be read out of the first row is thereby fixed to the power supply voltage VDD, and an electric potential V32 of the vertical signal line 32 attains (VDD−VGS−M312). The clamp pulse φCL and the sample-and-hold pulse φSH of the CDS circuit 10 are also driven to H level.

(2): In a subsequent reset-sampling period T2, the reset pulse φRST1 of the first row is brought to L level, and the reset pulse φRST2 of the second row is driven to H level. Further, the pixel power supply VDD1 is set to the first clip voltage. The voltage VDF12 of the floating diffusion section FD12 of the pixel P12 of the first row thereby falls as shown in the figure for example because of a leaking-in of electric charges from the photodiode PD due to the incidence of a high-luminance light. At the clip voltage generating pixel P22 of the second row, on the other hand, the voltage VFD22 of the floating diffusion section FD22 is fixed at the first clip voltage VclipH. The electric potential V32(Rst) of the vertical signal 32 is therefore clipped at (VclipH−VGS−M322) so as to be ready for suppression of an occurrence of the black sun phenomenon due to differential processing at the CDS circuit 10 which is to be performed next. It should be noted that VGS−M322 is a gate-source voltage of the amplification transistor M322 of the pixel P22. In an end period of the reset-sampling period, then, the clamp pulse φCL is brought to L level to clamp the potential V32(Rst) (=VclipH−VGS−M322) of the vertical signal 32 to the CDS circuit 10.

(3): In a subsequent transfer period T3, the pixel power supply VDD1 is set to the second clip voltage while keeping the reset pulse φRST2 of the clip voltage generating pixel of the second row at H level. The voltage VFD22 of the floating diffusion section FD22 of the pixel P22 is thereby switched to and fixed at the second clip voltage VclipL. Next, after bringing the pixel power supply VDD1 to the power supply voltage VDD, the transfer pulse φTR1 of the pixel row of the first row is driven to H level. The voltage VFD12 of the floating diffusion section FD12 of the pixel P12 of the first row (row to be read out) thereby falls due to an accumulated electric charges of the photodiode PD.

(4): In a subsequent signal sampling period T4, the transfer pulse φTR1 of the pixel row of the first row is brought to L level. At this stage, although the voltage VFD12 of the floating diffusion section FD12 of the pixel P12 of the first row falls to a level at which the highlight transverse stripe occurs, the voltage VFD22 of the floating diffusion section FD22 of the clip voltage generating pixel P22 of the second row is fixed at the second clip voltage VclipL. Since the potential V32(Sig) of the vertical signal 32 is thereby clipped to (VclipL−VGS−M322) so that a change in the pixel bias current can be avoided, the highlight transverse stripe phenomenon is suppressed.

Subsequently, a difference between a reset potential and a potential of reading light signal after transfer of the vertical signal line 31 to 33 is retained at the sample-and-hold capacitor C12 by a processing operation of the CDS circuit 10. Such difference is then outputted through the column select transistor M6 and the output amplifier 5 as an image signal where the black sun and the highlight transverse stripe phenomena are prevented. The image signals of one frame are obtained by thereafter repeating similar operation with changing the pixel row to be read out and, in addition, with also changing the clip voltage generating pixel row correspondingly to such change.

According to the present embodiment as the above, since the pixel power supply VDD1 of all pixel rows are driven in a manner of pulse, the number of pixel power supply for controlling each pixel row can be reduced so that an advantage of simplified construction is obtained. Further, while the above embodiment has been shown similarly to the first embodiment as using the same one pixel as the output pixel of the first clip voltage VclipH and of the second clip voltage VclipL, it is also possible similarly to the second embodiment to use different ones of the pixels as the one for outputting the first clip voltage VclipH and the one for outputting the second clip voltage VclipL by changing control timings of the select pulse, reset pulse, etc.

Embodiment 4

A fourth embodiment of the invention will now be described. In this embodiment, one having a 3-transistor construction where a select transistor is omitted is used as the pixels of the pixel section. The pixel power supply then is made capable of being set in a manner of pulse to 4 different electric potentials of a power supply voltage VDD, a first clip voltage VclipH, a second clip voltage VclipL, and a voltage VDDL that is lower than the second clip voltage VclipL.

Figure 13:
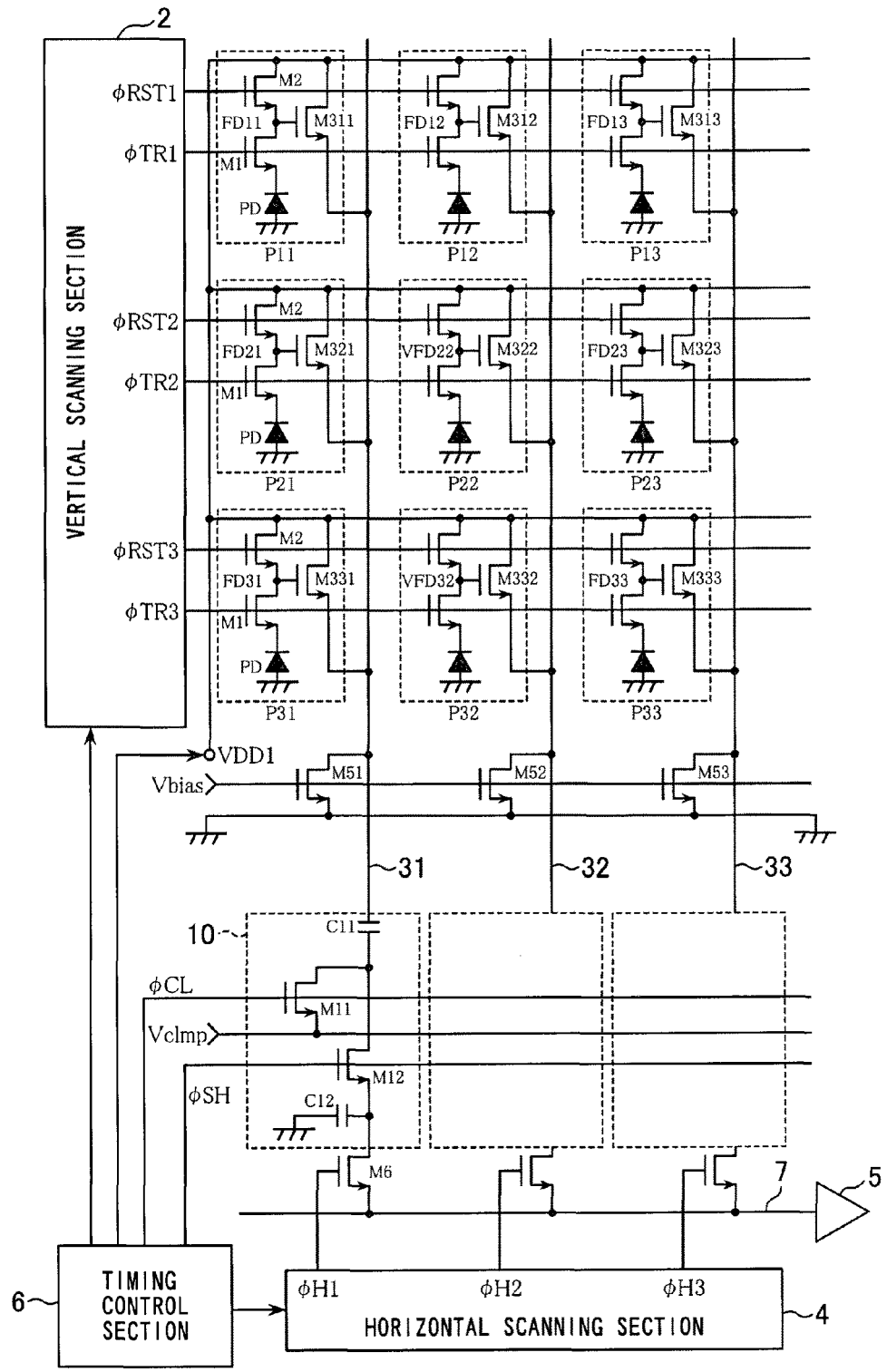
FIG. 13 is a circuit diagram showing construction of the solid-state imaging apparatus according to a fourth embodiment of the invention.

FIG. 13 is a circuit diagram showing construction of the solid-state imaging apparatus according to the fourth embodiment, where like or corresponding components as the first to third embodiments shown in FIGS. 7, 9, and 11 are denoted by like reference symbols, and a description thereof will be partially omitted. Here, only a 3-row by 3-column portion is shown for ease of explanation as the pixel section where pixels are two-dimensionally arranged. Each pixel respectively includes: a photodiode PD; a floating diffusion section FD11 to FD33; a transfer transistor M1; a reset transistor M2; and an amplification transistor M311 to M333. One end of the amplification transistor of the pixels arranged in a column direction is connected in common respectively to the vertical signal lines 31 to 33. The pixel power supply VDD1 to each pixel then is made capable of being set in a manner of pulse to 4 different electric potentials of the power supply voltage VDD, to the first clip voltage VclipH, to the second clip voltage VclipL, and to the voltage VDDL which is lower than the second clip voltage VclipL. The rest of the construction is similar to the first to third embodiments.

Figure 14:
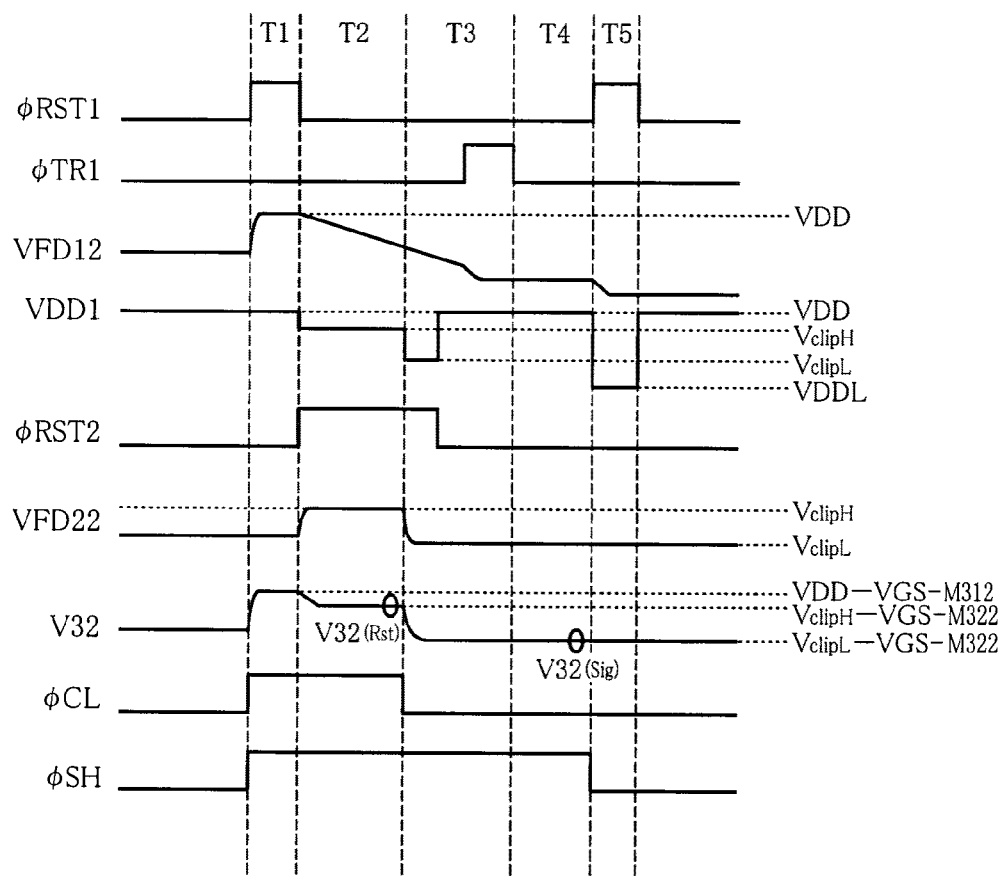
FIG. 14 is a timing chart for explaining operation of the fourth embodiment shown in FIG. 13.

An operation of thus constructed solid-state imaging apparatus according to the fourth embodiment will now be described by way of a timing chart shown in FIG. 14. The operation of the solid-state imaging apparatus according to the fourth embodiment from the FD section reset period T1 to the signal sampling period T4 is similar to the operation of the third embodiment shown in FIG. 12, and will not be described. After an end of the signal sampling period T4, when the system enters a next period T5, the sample-and-hold pulse φSH is brought to L level and the reset pulse φRST1 of the first row to H level, and, in addition, the pixel power supply VDD1 is set to the voltage VDDL. The voltage VFD12 of the floating diffusion section FD12 of the pixels of the first row thereby falls to VDDL; in the case of continuing operation in a next step with making the pixel row of the second row as a row to be read out and the pixel row of the third row as a clip voltage generating row, it is adapted so as not to output a pixel output of the pixel row that is becoming a non-read row (first row) to the vertical signal line so that the reading of signal out from the pixels of the second row is not affected.

The image signals of one frame are obtained by thereafter repeating similar operation with moving the row to be read out as the above, with also moving the clip voltage generating row correspondingly to such moving, and with setting to VDDL the pixel voltage for the pixel rows other than the row to be read out and the clip voltage generating row.

According to the present embodiment as the above, in addition to the advantages of the third embodiment, since the pixel is formed with omitting a select transistor, it is possible to increase an occupancy rate of the photodiode within pixel so as to improve sensitivity. Further, while the above embodiment has been shown similarly to the first embodiment as using the same one pixel as the output pixel of the first clip voltage VclipH and of the second clip voltage VclipL, it is also possible similarly to the second embodiment to use different ones of the pixels as the one for outputting the first clip voltage VclipH and the one for outputting the second clip voltage VclipL by changing control timings of the select pulse, reset pulse, etc.

Embodiment 5

A fifth embodiment of the invention will now be described. This embodiment concerns the solid-state imaging apparatus having a mechanical shutter. The construction itself of the solid-state imaging apparatus according to this embodiment is identical to those according to the first to fourth embodiments, and is provided with a mechanical shutter and a mode setting section for setting use/nonuse of the mechanical shutter (not shown) so that the manner of control of the timing control section is also changed and set by the setting at the mode setting section.

An operation of thus constructed fifth embodiment will now be described. In the case where a mode for not using the mechanical shutter (for example at the time of taking a moving picture) is set by the mode setting section, a read operation such as one shown in the timing chart of FIG. 8 is performed for example when the solid-state imaging apparatus of the construction shown in the first embodiment is used.

An operation where, on the other hand, a mode for using mechanical shutter (for example at the time of taking a still picture) is set by the mode setting section will now be described by way of a timing chart shown in FIG. 15. The timing chart shows an operation when one having the construction shown in the first embodiment is used as the solid-state imaging apparatus.

(1): In the case of taking an image with using the mechanical shutter (for example at the time of taking a still picture), after an accumulation of signal electric charges to the photodiode PD, the mechanical shutter is brought from its open condition to closed condition before entering a FD section reset period T1. Next, the select pulse φROW1 of the first row is driven to H level. Since the mechanical shutter at the time of reading signal is in its closed state, there is not any leaking-in or the like of electric charges from the photodiode due to an incidence of high-luminance light so that the black sun phenomenon does not occur. It is therefore not necessary to generate the first clip voltage VclipH, and the pixel power supply VDD2 of the clip voltage generating row of the second row is fixed at the second clip voltage VclipL.

Then upon entering the FD section reset period T1, the reset pulse φRST1 of the first row is driven to H level. The voltage VFD12 of the floating diffusion section FD12 of the pixel P12 of the row to be read out of the first row is thereby fixed to the power supply voltage VDD, and the electric potential V32 of the vertical signal line 32 attains (VDD−VGS-M312). The clamp pulse φCL and the sample-and-hold pulse φSH of the CDS circuit 10 are also driven to H level.

(2): In a subsequent reset-sampling period T2, while the reset pulse φRST1 of the first row is brought to L level, the voltage VFD12 of the floating diffusion section FD12 of the pixel P12 of the first row maintains at the power supply voltage VDD because there is not any leaking-in or the like of electric charges from the photodiode PD due to an incidence of high-luminance light, whereby the potential V32 of the vertical signal line 32 also remains at (VDD−VGS-M312). In an end period of the reset sampling period, then, the clamp pulse φCL is brought to L level to clamp the electric potential (VDD−VGS-M312) of the vertical signal 32 to the CDS circuit 10.

(3): In a subsequent transfer period T3, the select pulse φROW2 and the reset pulse φRST2 of the clip voltage generating pixel of the second row are driven to H level, and at the same time the transfer pulse φTR1 of the pixel row of the first row is driven to H level. The floating diffusion section voltage VFD12 of the pixel 12 of the first row (row to be read out) thereby falls due to an accumulated electric charges of the photodiode PD. Further, the floating diffusion section voltage VFD22 of the clip voltage generating pixel P22 of the second row is fixed at the second clip voltage VclipL.

(4): In a subsequent signal sampling period T4, the transfer pulse φTR1 of the pixel row of the first row is brought to L level while keeping the reset pulse φRST2 of the pixel row of the second row at H level. At this stage, although the voltage VFD12 of the floating diffusion section FD12 of the pixel P12 of the first row falls to a level at which the highlight transverse stripe occurs, the voltage VFD22 of the floating diffusion section FD22 of the clip voltage generating pixel P22 of the second row is fixed at the second clip voltage VclipL. A change in the pixel bias current can be avoided as the potential V32(Sig) of the vertical signal 32 is thereby clipped to (VclipL−VGS-M322) so that the highlight transverse stripe phenomenon is suppressed.

Subsequently, a difference between a reset potential and a potential of reading light signal after transfer of the vertical signal lines 31 to 33 is retained at the sample-and-hold capacitor C12 by a processing operation of the CDS circuit 10. Such difference is then outputted through the column select transistor M6 and the output amplifier 5 as an image signal where the highlight transverse stripe phenomenon is prevented. The image signals of one frame are obtained by thereafter repeating similar operation with changing the row to be read out and with also changing the clip voltage generating row.

While a thinned-out read in the vertical direction is usually effected when taking a moving picture without using a mechanical shutter, it is possible to use those rows for use in the thinning-out (rows to be omitted) as a clip voltage generating row. Further, while a case of using the solid-state imaging apparatus shown in the first embodiment has been described by way of an example in the above embodiment, it is also possible to use those other solid-state imaging apparatus as shown in the second to fourth embodiments.

With the present embodiment as the above, in addition to the advantages of the foregoing embodiments, it is possible to effectively suppress the black sun phenomenon and the highlight transverse stripe phenomenon in the case where switching is to be made by a mode setting section between an image taking with using and an image taking without using a mechanical shutter.

According to the invention as has been described by way of the above embodiments, it is made possible to suppress an occurrence of the black sun phenomenon by clipping a reset level of the pixel and also to suppress an occurrence of the highlight transverse stripe phenomenon by clipping a signal level of the pixel with using an output onto the output signal line of a second pixel different from a first pixel connected to the same one output signal line on the first pixel's output onto the output signal line which is to be subjected to noise suppressing operation. It is thereby possible to achieve a solid-state imaging apparatus in which a clip operation for suppressing the black sun phenomenon and the highlight transverse stripe phenomenon is made possible with suppressing a variance without providing a separate clip circuit.

What is claimed is:

1. A solid-state imaging apparatus comprising:
a pixel section having a plurality of pixels two-dimensionally arranged into a matrix, each pixel containing a photoelectric conversion section for converting an incident light into signal electric charges, an accumulation section for accumulating said signal electric charges generated at the photoelectric conversion section, an amplification section for amplifying and outputting onto an output signal line said signal electric charges accumulated at the accumulation section, and a reset section for resetting said accumulation section to a reset potential set on a reset line;
a load section connected at one end thereof to said output signal line and grounded at the other end for making constant an electric current flowing through said amplification section;
a noise suppressing section connected to said output signal line using a first signal being an output from said pixel at the time of resetting by said reset section to effect a noise suppressing operation where noise components contained in a second signal corresponding to said signal electric charges are suppressed; and
a control section for, of the outputs onto said output signal line of a first pixel being subject of said noise suppressing operation, respectively limiting said first signal and said second signal to a first electric potential and to a second electric potential with using an output resulting from reset operation by said reset section onto said output signal line from a second pixel different from said first pixel and connected to the same one of said output signal line as said first pixel,
wherein a power supply voltage provided to said second pixel is switchable.

2. The solid-state imaging apparatus according to claim 1, wherein said second pixel for use in limiting to said first electric potential and one for use in limiting to said second electric potential are the same one pixel.

3. The solid-state imaging apparatus according to claim 1, wherein said second pixel for use in limiting to said first electric potential and one for use in limiting to said second electric potential are different pixels.

4. The solid-state imaging apparatus according to claim 1, wherein said second pixel for use in limiting to said first electric potential and to said second electric potential is a pixel located near said first pixel.

5. The solid-state imaging apparatus according to claim 1, wherein said control section sets as said second electric potential an electric potential with which said load section is not turned OFF.

6. The solid-state imaging apparatus according to claim 1, wherein said control section sets said first electric potential to a level higher than said second electric potential.

7. The solid-state imaging apparatus according to claim 1, wherein said reset line is changeable with respect to said reset potential by the unit of row by said control section, and said control section makes variable the reset potential of said reset line associated with pertinent ones of said pixels in accordance with a location of said second pixel for use in setting said first electric potential and said second electric potential.

8. The solid-state imaging apparatus according to claim 1, wherein said reset line is made capable of variably supplying a common reset potential to all the pixels by said control section, and said control section controls said reset section so as to avoid an overlap of timings for applying respective reset potentials to said first pixel and to said second pixel.

9. The solid-state imaging apparatus according to claim 1, further comprising a mode setting section for setting one operation mode selected from a plurality of operation modes associated with image taking, wherein said control section causes a limiting operation to said first electric potential differently in accordance with a set operation mode.

10. The solid-state imaging apparatus according to claim 9, wherein the limiting operation caused by said control section is only of said second signal to the second electric potential when an operation mode where the incident light entering said photoelectric conversion section is cut off is set as said set operation mode after accumulation of said signal electric charges at said photoelectric conversion section.

* * * * *